United States Patent [19]
Merour

[11] Patent Number: 5,988,355
[45] Date of Patent: Nov. 23, 1999

[54] METHOD AND DEVICE FOR HANDLING ARTICLES

[75] Inventor: Philippe Merour, Dracy Le Fort, France

[73] Assignee: Saint-Gobain Emballage, Courbevoie, France

[21] Appl. No.: 08/913,524

[22] PCT Filed: Jan. 17, 1997

[86] PCT No.: PCT/FR97/00100

§ 371 Date: Jan. 5, 1998

§ 102(e) Date: Jan. 5, 1998

[87] PCT Pub. No.: WO97/26220

PCT Pub. Date: Jul. 24, 1997

[30] Foreign Application Priority Data

Jan. 19, 1996 [FR] France ................................. 96 00581

[51] Int. Cl.[6] ................................................. C03B 35/10
[52] U.S. Cl. ........................................... 198/493; 65/323
[58] Field of Search .............................. 198/493; 65/323, 65/260

[56] References Cited

U.S. PATENT DOCUMENTS

| 3,340,038 | 9/1967 | Hartman . | |
|---|---|---|---|
| 3,857,691 | 12/1974 | Jones et al. | 65/303 |
| 3,893,835 | 7/1975 | Jones et al. | 65/122 |
| 4,927,444 | 5/1990 | Voisine | 65/323 |

FOREIGN PATENT DOCUMENTS

| 0277683 | 8/1988 | European Pat. Off. . |
| 2292551 | 2/1996 | United Kingdom . |

*Primary Examiner*—James R. Bidwell
*Attorney, Agent, or Firm*—Oblon, Spivak, McClelland, Maier & Neustadt, P.C.

[57] ABSTRACT

A method of handling articles in which at least one mechanical tool conveys the article or plays a part in transferring the article, and according to which at least one jet of gas under pressure is blown through a duct passing through the mechanical tool, and also according to which the article is held in position on the mechanical tool while limiting contact therewith, by means of the said jet of gas.

14 Claims, 8 Drawing Sheets

METHOD AND DEVICE FOR HANDLING ARTICLES

BACKGROUND OF THE INVENTION

The invention relates to a technique for handling articles. More particularly, the invention deals with techniques for handling articles while they are being made and more specifically articles which are at a high temperature.

DESCRIPTION OF THE BACKGROUND

Although the invention is not limited to this type of industry, it will be described with reference to the industry which deals with the manufacture of glass containers of the bottle or flask type. To make it easier for the reader to understand, the invention will more specifically be described with reference to "pushers". Pushers are tools allowing the bottles as they leave the mould in which they were formed to be transferred to a conveyor of the rolling belt type which takes them away, for example, towards an annealing tunnel.

These pushers usually consist of several compartments in which several bottles are accommodated at the same time. Their use consists, as soon as the bottles are released from the moulds, in moving the said pushers towards the bottles in order to push the latter towards the conveyor belt. Each bottle finds itself in a compartment of the pusher designed for this purpose.

As the pusher pushes the bottles, there is always, a priori, contact between the pusher and the bottles, and the risks of this contact are generally lessened by the presence of contact materials such as carbon or special resins fixed to the metal walls of the pushers. Such contact is to be avoided because the bottles, owing to their temperature at this stage in the production, may become marked, which leads to defects such as scratching, glazing. These defects lead either to a reduction in the mechanical strength of the articles, or possibly to them being scrapped.

What is more, the fact that the bottles are moved along by being pushed, without being held entirely firmly by the walls of the compartments of the pushers, may lead to unsteady movement, or even to the bottles falling over and therefore breaking, or alternatively to the production machine becoming covered in glass.

The creation of suction by means of a vacuum in order to pull the bottles onto the walls of the pusher as they are being transferred from one place to another has already been proposed. One such technique does indeed allow a bottle to be held correctly in position while it is being transferred but contributes to increasing the risks of defects due to the contact with the walls of the pushers. This is because the bottles thus pulled have at least one generatrix in contact with one wall of the pusher, and generally two, given that the bottle is wedged into a corner of the pusher. Another technique, especially described in U.S. Pat. No. 4,927,444 consists in blowing a jet of air from an orifice placed on the pusher on a wall facing the point at which a bottle is to be held in place. According to this technique, the bottles are held in place against the walls of the pusher by the pressure of the jet of air which presses the bottles against the walls. This technique has the same drawbacks as the technique described earlier because it accentuates the contact between the bottles and the walls, and therefore the risks of defects appearing.

SUMMARY OF THE INVENTION

The subject of the invention is a method of handling articles which gives precise positioning of the article during handling while at the same time avoiding as far as possible any contact with the tools. In the case of a pusher, the object of the invention is thus to hold a glass bottle firmly in position in a pusher while at the same time limiting the contacts between the walls of the pusher and the bottle.

This object is achieved according to the invention using a method of handling articles in which at least one mechanical tool conveys the article or plays a part in transferring the article, and according to which at least one jet of gas under pressure is blown through a duct passing through the mechanical tool, and the article is held in position on the mechanical tool while limiting contact therewith, by means of the said jet of gas. The method according to the invention is more particularly suited to handling glass articles which are at a high temperature, that is to say a temperature which may especially lead to defects in the article upon contact with a tool. This is because the jet of gas blown through the duct which, logically speaking ought to push the article away, may create a suction thereon when the said article is separated from the said orifice by a given distance. This distance quite obviously depends on various parameters of the jet associated especially with the pressure, the flow rate of gas and with the dimensions of the orifice of the duct and the diameter of the object. When this distance decreases further, that is to say as the article comes up very close to the orifice of the duct and therefore the wall of the tool, the jet of gas again acts to push it away. This reduction in the distance takes place automatically, for example, in the case of a pusher, because on the one hand the pusher is advancing towards the bottle and because on the other hand the bottle is being sucked towards the pusher.

DETAILED DESCRIPTION OF THE INVENTION

The method according to the invention therefore makes it possible, using a suction phenomenon, to hold the article in position on the mechanical tool while at the same time avoiding as far as possible any contact therewith, because the jet of gas resumes a pushing-away function when the orifice-article distance becomes very small. In the case of a pusher, contacts between the tool and the article may remain, but these are only point contacts and occur only infrequently in contrast to the techniques of the prior art discussed earlier where permanent contacts exist along at least one generatrix of the body of a bottle. These point contacts may be due to slight wobbling of the bottle, as it is not possible for the latter to be perfectly stable as it is being moved along. The results obtained according to the invention, that is to say holding an article in position without contact with the walls, are very good when the article comes up directly opposite the orifice of the duct. It has become apparent that the results are just as satisfactory when the article does not come up directly opposite the orifice but is slightly offset or offcentred with respect to the said orifice.

However, and especially in the case of the pusher, it may prove tricky to manage simultaneously the movement of the tool and the jet of gas; this is because whereas the pusher approaches the bottles in order to drive them along, the jet of gas under pressure tends to push the bottles away as long as the critical distance has not been reached, that is to say the distance separating the orifice from the bottle beyond which the said bottle experiences a phenomenon of suction.

According to a first alternative form of the invention, provision is made to initiate the blowing of the gas when the article reaches the said critical distance, that is to say when, for example, the pusher is close enough to the bottle for a phenomenon of suction to occur. This solution is satisfactory but may lead to an increase in cost because it is accompanied, for example, by sensors determining the position of the article and connected to devices for starting the blowing of gas. In addition, one and the same pusher may convey several bottles simultaneously, the said bottles having relative positions with respect to the pusher which may differ from one bottle to another. It may therefore be necessary to design a device which manages the air blowings independently of one another for each of the bottles; such a device is even more complicated and therefore more expensive.

According to a second alternative form of the invention, provision is made to blow the jet of air through a duct arranged relative to the wall of the mechanical tool on which it emerges in such a way as to create a Coanda effect on the wall of the mechanical tool. According to this second alternative form, the flow of air blown through the orifice of the duct runs along the wall of the tool and therefore no longer points towards the article. In the case of a pusher, the air blowing may therefore start before the pusher has approached the bottle, without the risk of the bottle being pushed away. There is then a phenomenon of suction irrespective of the distance separating the bottle from the orifice, this phenomenon becoming appreciable when the bottle becomes close to the orifice. However, when the distance separating the article from the orifice of the duct reduces further, the jet of gas ends up pushing the article away so that the article is held in position without in any way having contact with the walls of the mechanical tool.

The duct is advantageously made in such a way that the flow of gas runs along the wall in a direction similar to the relative path followed by the article with respect to the tool. For example, if in the case of a pusher it is desired to hold the bottle in a corner formed by two walls of the said pusher, the duct will be produced in such a way that the flow of gas leads off towards this corner. In this way, this gaseous flow does not disturb the advancement of the article. Moreover, it has become apparent in some cases that this gaseous flow may also advantageously play a part in driving the article along and therefore assist with its movement.

Also, with the objective of not disturbing the movement of the article with respect to the tool and by contrast of assisting or even orienting this movement, provision is advantageously made to blow at least two jets of gas acting simultaneously or in succession on one and the same article or on different articles. The invention also proposes a device for implementing the method which has just been described. According to the invention, this device for handling articles includes a mechanical tool, such as a pusher, for conveying the article or playing a part in transferring it, at least one wall of the tool being pierced with at least one duct connected to a source of gas under pressure and the orifice of the said duct being placed such that the distance separating it from the article decreases during at least a first phase in the handling. The device thus described therefore makes it possible, by blowing a jet of air, to create a phenomenon of suction on the article which will therefore start off by moving close to the orifice of the duct.

According to a preferred form of the invention, in order to create a Coanda effect on the wall of the mechanical tool, the direction of the duct forms an angle with the surface of the wall through which it passes. This angle needs to have a minimum value which depends on the pressure of the gas and the geometric characteristics of the wall and of the duct.

In order to obtain a Coanda effect, the orifice of the duct advantageously has the shape of a slit or alternatively consists of a set of holes, preferably aligned holes.

In addition to the use of the method for improving the efficiency of the pushers, the invention envisages other applications including those listed below without implied limitation.

These are first of all an application of the method for the alignment of bottles on a conveyor. For such an application, the invention allows good positioning of the bottles with little or no contact between the bottles and the wall of the tool or "alignment device" and, furthermore, in cases where a Coanda effect is created, the gaseous flow contributes to the advancement of the bottles as was explained earlier.

Another application deals with the transportation of gobs after these have been cut. The gobs are "drops" of glass obtained from molten glass and which are brought to the forming devices using "troughs". According to the invention, the troughs are associated with ducts of a gas under pressure which allow the position of the gobs to be controlled accurately, limiting their contact with the troughs. The invention therefore allows good control over the position in which the gobs arrive at the forming device.

Other advantageous features and details of the invention will become clear below from the description of embodiments of the invention given with reference to the figures which represent:

FIGS. 4, 5, curves illustrating the results obtained with the device of FIG. 3, FIG. 6, an alternative form of FIG. 3, FIG. 7, the results obtained according to this alternative form, FIG. 8, a diagram of part of a pusher according to another embodiment of the invention, FIG. 9, the results obtained according to the diagram of FIG. 8, in the case of FIG. 10, FIG. 10, an alternative form of FIG. 8, FIG. 11, another alternative form of FIG. 8, FIG. 12, the results obtained according to the alternative form of FIG. 11, FIG. 13, the results obtained according to another alternative form of FIG. 8, FIG. 14, a diagram of an alternative form according to the invention, FIG. 15, a diagram of a pusher according to the invention, FIGS. 16 and 17, two diagrams representing the movement of the pusher according to FIG. 15.

Figure 1:
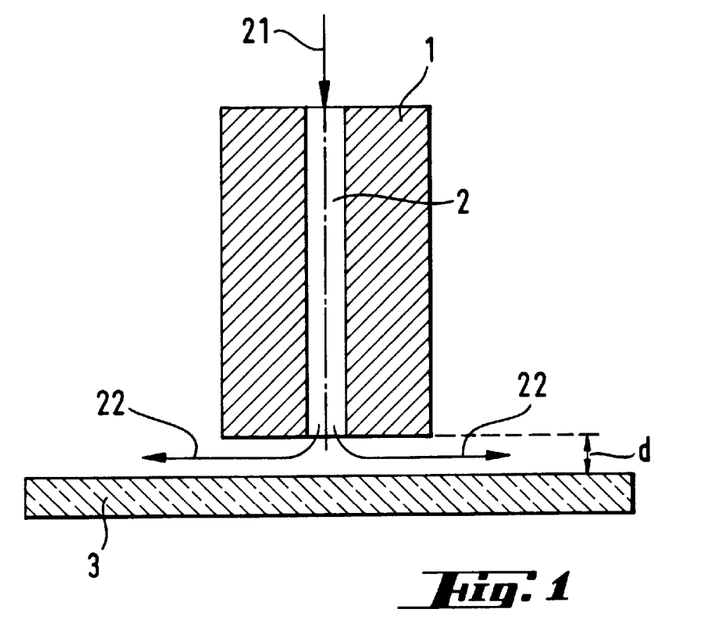
FIG. 1, a diagram of a device illustrating the principle of the invention.

Represented in FIG. 1 in side elevation is a diagram of a device making it possible to demonstrate the phenomenon described in the application. This simplified device is composed of a cylinder 1 of diameter 30 mm through which there passes a passage 2 of circular section with a diameter of 1 millimetre. A gas under pressure such as air is blown through this passage. The direction of blowing is indicated by the arrows 21,22. Facing the orifice through which the gas emerges is a plate of glass 3. During trials, it became clear that at a distance "d" of approximately 4 millimetres or less separating the orifice from the plate of glass 3, the said plate 3 experiences a suction force and tends to be driven towards the cylinder 1. For a distance greater than the one just mentioned, the jet of gas leaving the orifice of the cylinder 1 tends to push the plate of glass 3 away. This position situated at a distance of approximately 4 millimetres can therefore be likened to a position of unstable equilibrium. When the distance between the orifice and the plate of glass 3 is less than 4 mm, the said plate 3 is therefore sucked towards the cylinder 1; however, as the distance between the orifice and the plate 3 becomes less than approximately 0.2 millimetres, the plate 3 then experiences a force of repulsion. The position of the plate 3, at a distance of approximately 0.2 millimetres away from the orifice, may therefore be likened to a position of stable equilibrium. Indeed, if the relative positions of the cylinder 1 and of the plate 3 are altered slightly, the plate 3 will be repositioned in a position of stable equilibrium either under the effect of a suction force when, for example, the cylinder 1 is moved slightly away from the plate 3, or under the effect of a force which tends to move the said plate 3 away when, for example, the cylinder 1 is brought slightly closer to the glass plate 3.

Figure 2:
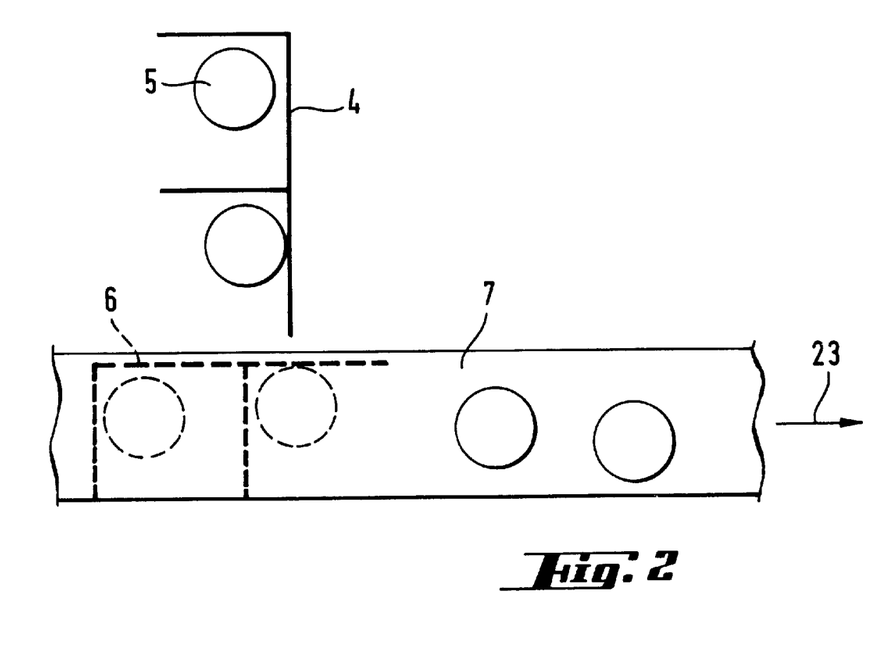
FIG. 2, a diagram of a pusher.

FIG. 2 represents a diagram, viewed from above, of a pusher 4 as may be found in the glassmaking industry. Such pushers 4 are especially used for bringing the bottles 5 which have just been manufactured from the moulding zone, as soon as they are released from the mould, towards a conveyor belt 7 which may, for example, take them towards an annealing tunnel, in the direction indicated by the arrow 23.

The movement of the pusher 4 towards its position 6 for bringing the bottles 5 onto the conveyor 7 is represented in this FIG. 2.

The subsequent figures illustrate in greater detail the invention adapted to a pusher used for moving bottles which have just been manufactured.

Figure 3:
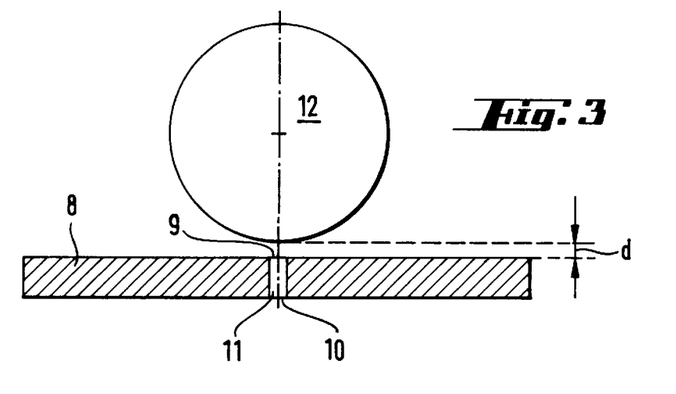
FIG. 3, a diagram of part of a pusher according to the invention.

A diagram, viewed from above, of part of a pusher is represented in FIG. 3. The wall 8 of the pusher includes an orifice 9 through which a gas under pressure emerges. The orifice 9 may be the end of a simple hole or alternatively of a slit. The other end 10 of the duct 11 is connected to a source, not represented, of gas under pressure. Trials were conducted using a glass bottle 12 with a diameter of 80 millimetres facing the orifice 9. These trials were conducted with pressures ranging between 1 and 5 bar, on the one hand when the duct 11 was a hole with a diameter of 2 millimetres, and on the other hand when the duct 11 was a slit 0.25 millimetres wide and 20 millimetres tall, the slit being parallel to the vertical axis of the bottle. The results of these trials are illustrated by the curves represented in FIGS. 4 and 5. These curves represent the force exerted on the bottle 12, expressed in Newtons, as a function of the distance "d" separating the bottle 12 from the orifice 9. Points on these curves which have a positive ordinate-axis value correspond to suction forces, and points which have a negative ordinate-axis value correspond to pushing forces.

Figure 4:
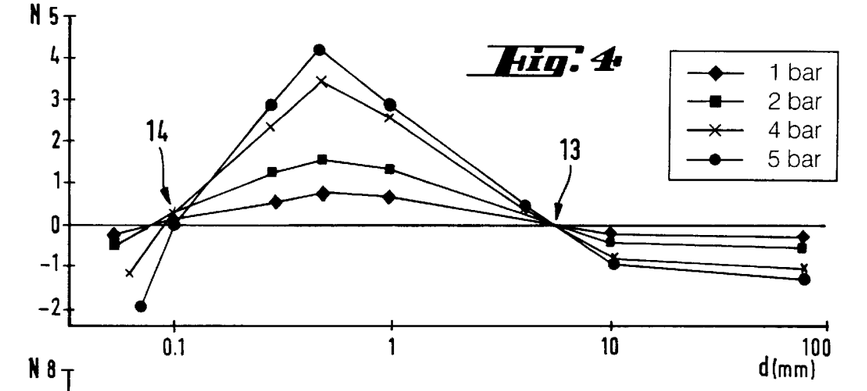

In the curves of FIG. 4 it is clear that as long as the distance is large enough, the bottle 12 experiences a pushing force and is therefore moved away from the wall 8 of the pusher. From a certain distance "d" corresponding to the point 13, and below this value, the bottle 12 experiences a suction force which attracts it towards the wall 8. This distance, which corresponds to a state of unstable equilibrium, in the case of this trial was slightly less than 10 millimetres and can vary depending on the pressure. When this distance reaches the point 14 corresponding to a value of approximately 0.1 millimetres, a value which varies as a function of the pressure, the bottle 12 again experiences a pushing force which therefore prevents any contact between the wall 8 and the bottle 12. This FIG. 4 shows that the pusher will be able to cause a bottle 12 to move along without the risk of damaging it because no contact between the wall 8 and the bottle 12 occurs. In effect, as soon as the bottle leaves the mould, a pusher advances towards the said bottle. As soon as the point 13 of unstable equilibrium is exceeded, the bottle 12 experiences a suction force which brings it as close as possible to the wall 8. As the pusher moves, the bottle gradually returns to a position of stable equilibrium with practically no contact with the wall 8; there may nonetheless be some contact between the wall 8 and the bottle 12, but this is only of a point-contact nature, for example if the bottle tilts slightly as it moves along. The bottle 12 is thus held in place in an almost stable fashion close to the wall 8 in one of the compartments of the pusher which are provided for this purpose. It is still possible to make the bottle be held more firmly as it is moved along by providing a second orifice, not represented in the figures, through which a gas is also blown under pressure, the said second orifice being situated on another wall of the pusher perpendicular to the wall 8. The bottle 12 can therefore be held firmly in the corner formed by the two walls without having any contact with the said walls of the pusher, the two orifices acting simultaneously on the bottle 12.

Figure 5:
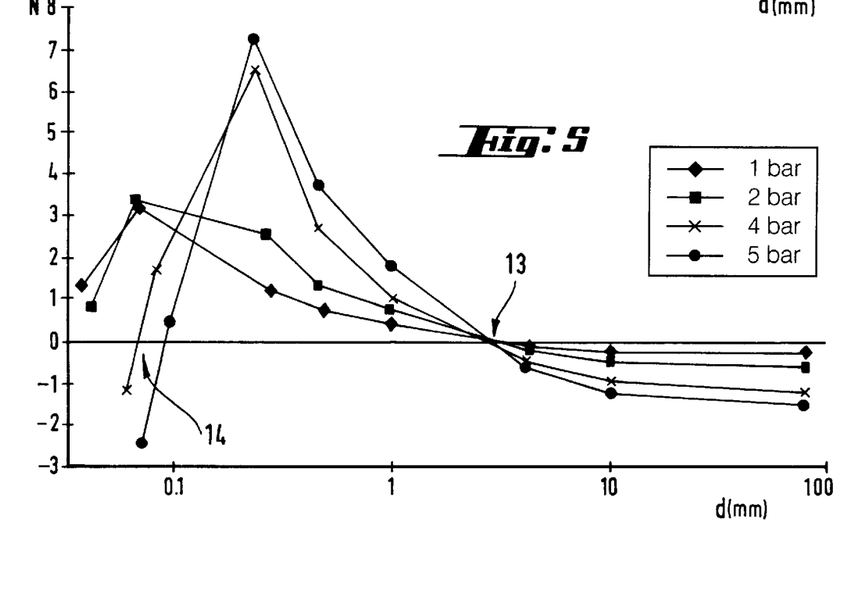

The curves of FIG. 5 illustrate the same phenomenon when the duct 11 is a slit having a width of 0.25 millimetres and a height of 20 mm.

Figure 6:
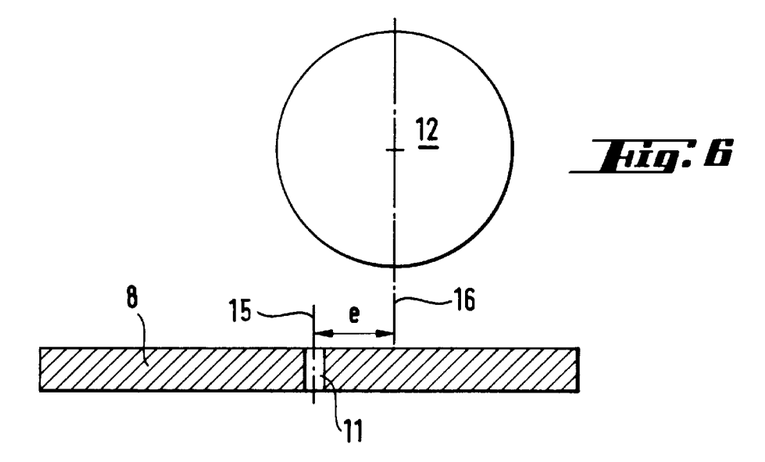
Figure 7:
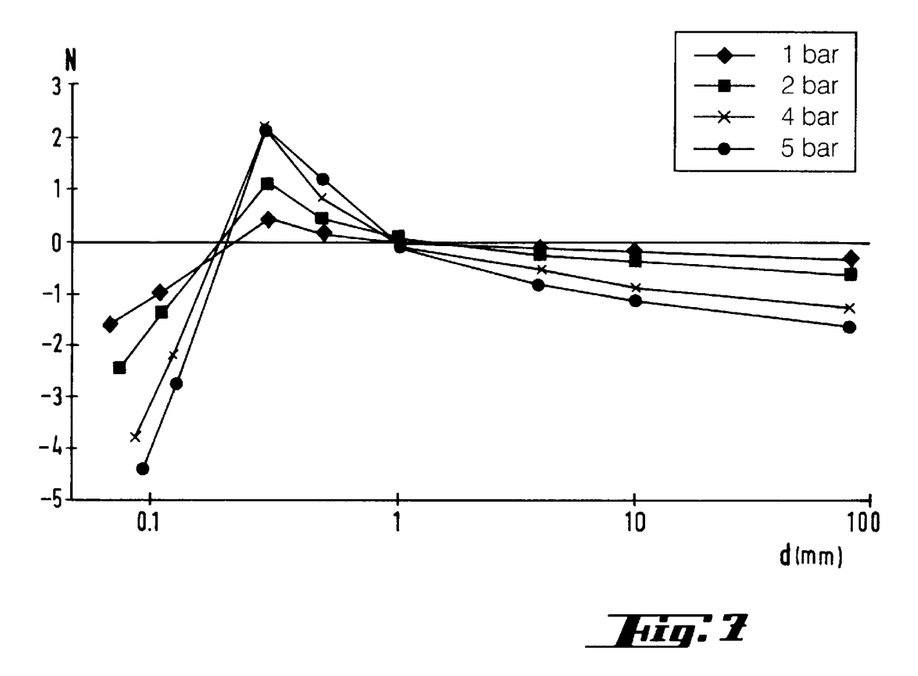

In the case of FIG. 3, and therefore of FIGS. 4 and 5, it was assumed that the bottle 12 presented itself along the axis of the orifice 9. Now, it is quite obvious that when the bottles are released from the moulds, they may have positions which vary somewhat, even if this is only on account of vibration due to the type of installation. FIG. 6 illustrates the case of a bottle 12 presenting itself facing the orifice 9 with a slight offset. This offset is represented in FIG. 6 by the distance "e" which separates the axis 15 of the duct 11 from the axis 16 of the bottle 12. Trials were also conducted according to this configuration and these are shown in FIG. 7 in the case of a slit where the various curves correspond to various pressures; the distance "e" is approximately 10 millimetres. The various curves show that despite the offset "e", the same phenomenon occurs and therefore allows the bottle 12 to be kept held firmly close to the wall 8 without any contact with the latter which may lead to damage to the bottle 12.

The various results given in FIGS. 4, 5 and 7 show that this first alternative form of the invention, illustrated in FIGS. 3 and 6, does indeed lead to the desired result: that of keeping the bottle 12 held firmly close to the wall 8 while at the same time limiting contact therewith. By contrast, in all cases, there is a region on the curves which corresponds to distances beyond the point of unstable equilibrium, where the bottles experience pushing forces. It therefore seems tricky to be able to bring a bottle 12 nearer without the risk of these forces destabilizing it, thus causing it to fall or even break. One solution consists in not starting to blow gas until the distance "d" separating the bottle 12 from the wall 8 corresponds to suction forces which will be exerted on the said bottle 12. It was stated earlier that although such a solution is conceivable, it is by contrast complicated to implement and has a high cost.

Figure 8:
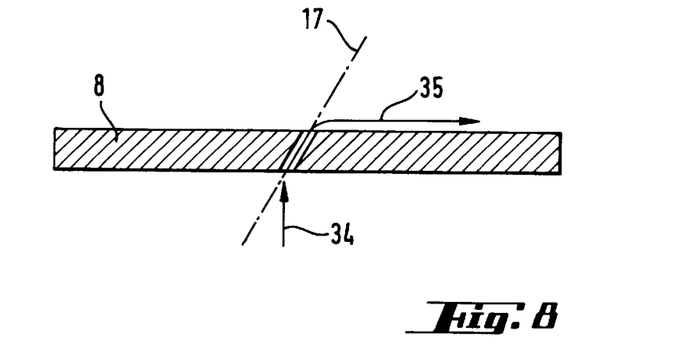
Figure 9:
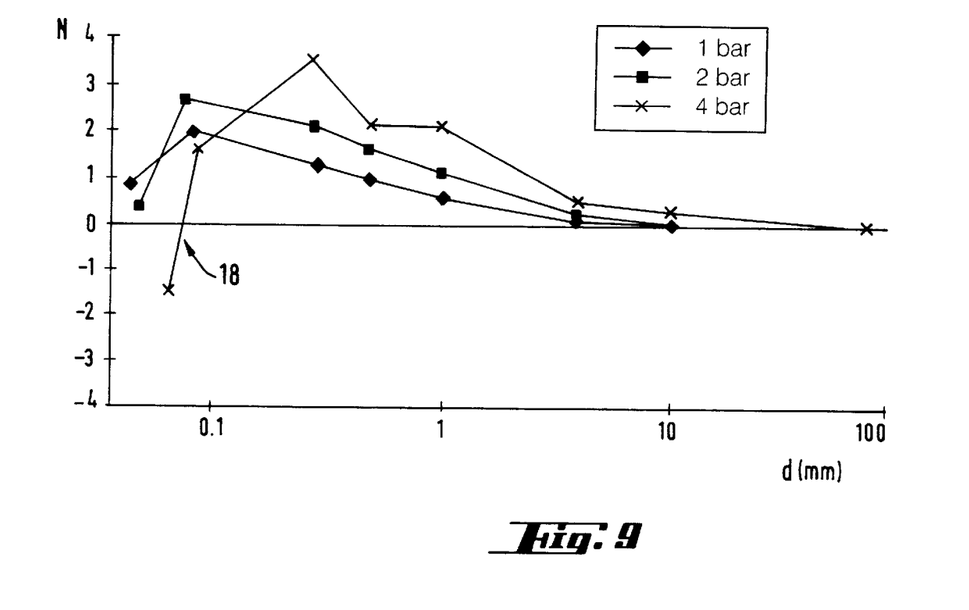
Figure 10:
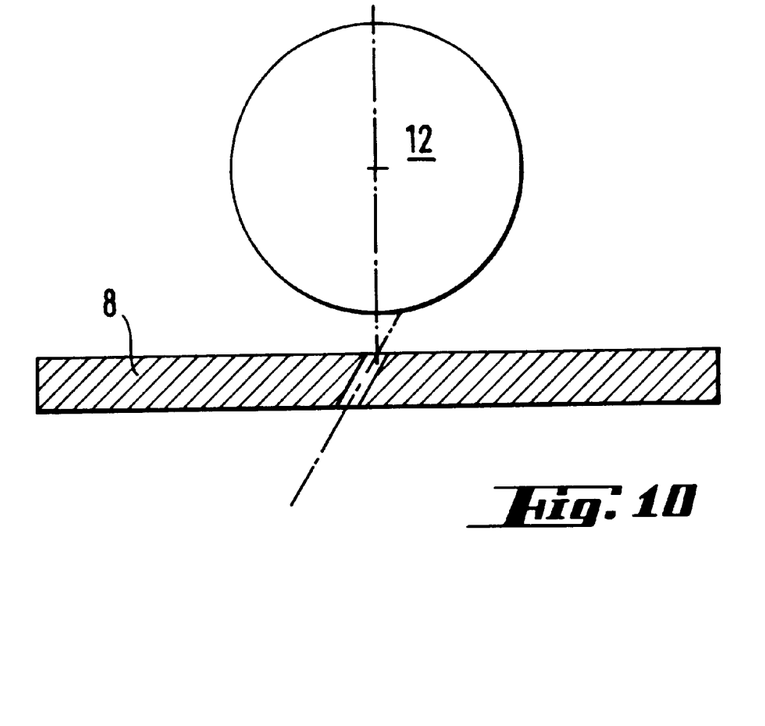

Another alternative form of the invention is illustrated in FIG. 8. According to this alternative form, the wall 8 has passing through it a slit through which a gas under pressure flows in the direction indicated by the arrows 24,25, the said slit forming an angle with the perpendicular to the surface of the wall 8. Such a configuration, with an angle which has to be greater than a value defined as a function of the dimensions of the slit and of the pressure of the gas, creates a Coanda effect on the wall 8; that is to say that the flow of gas leaving the slit runs along the surface of the wall 8 instead of coming out in the direction of the axis 17 of the slit as would be expected. Such a device therefore makes it possible, when a pusher advances towards a bottle, for this bottle not to be pushed away because the flow of gas is not pointing towards the bottle 12. This effect is illustrated in FIG. 9 which represents curves corresponding to various gas pressures, this gas passing through a slit 0.25 millimetres wide and 20 millimetres tall and making an angle of 45° with the perpendicular to the surface of the wall 8. In these trials, the bottle was 80 mm in diameter and was situated just facing the air-output orifice of the slit, as indicated in FIG. 10. These curves show that the bottle 12 is continuously sucked towards the wall 8 as far as the point 18 of stable equilibrium beyond which the bottle 12 is pushed away. In the suction zone, when the distance is great, the suction is almost negligible but the curves show that it becomes considerable when the distance "d" becomes smaller; indeed the suction values for these curves are comparable with those of the curves of FIGS. 4, 5 and 7. When the pusher is brought closer to the bottle 12, the latter therefore experiences suction forces which allow it to be held firmly close to the wall 8, while at the same time avoiding contact with the said wall 8.

Figure 11:
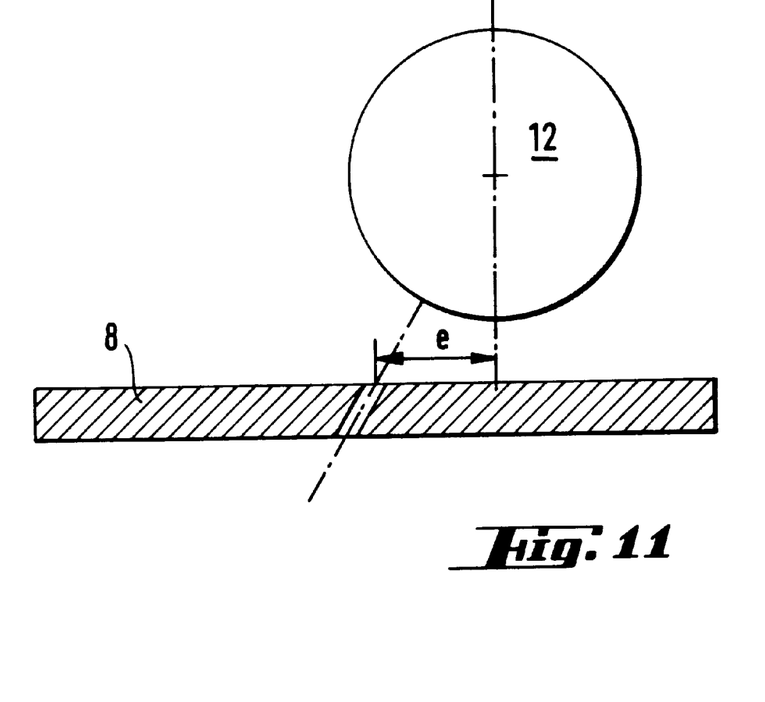
Figure 12:
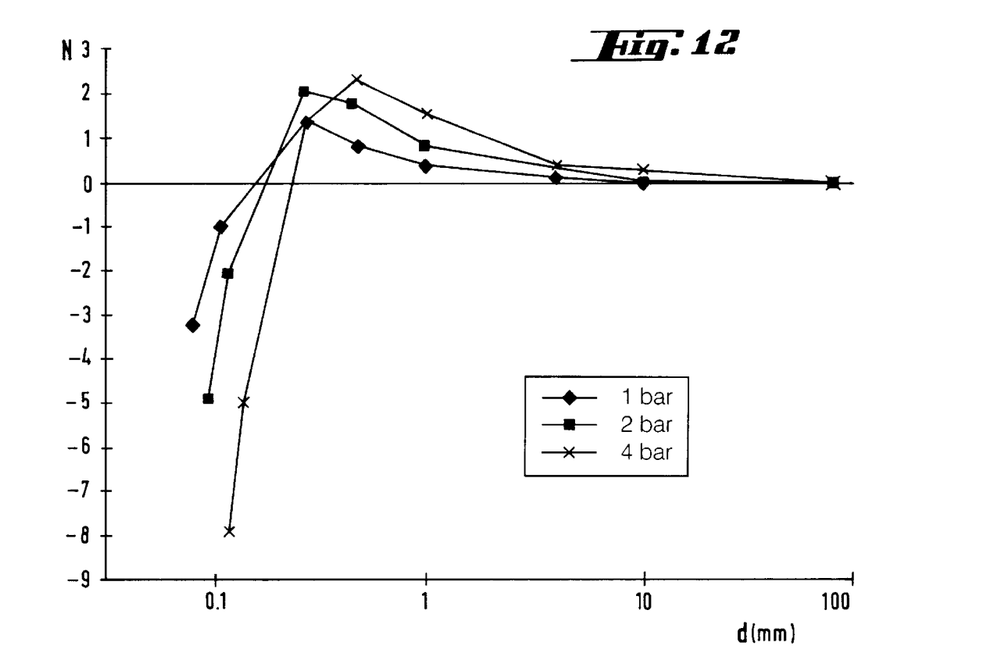

FIG. 11 describes the same device as FIG. 10 but the bottle 12 has an offset "e" with respect to the orifice of the slit. On measurement, this offset "e" was approximately 10 millimetres. The results of the trials carried out with several gas pressures are given in FIG. 12, which shows that even when a bottle is not presented directly facing the orifice, this alternative form according to the invention remains effective and allows the bottle 12 to be held firmly in the compartment provided for this purpose in the pusher while at the same time limiting contact with the wall 8 of the pusher as the pusher-bottle 12 assembly moves along.

Figure 13:
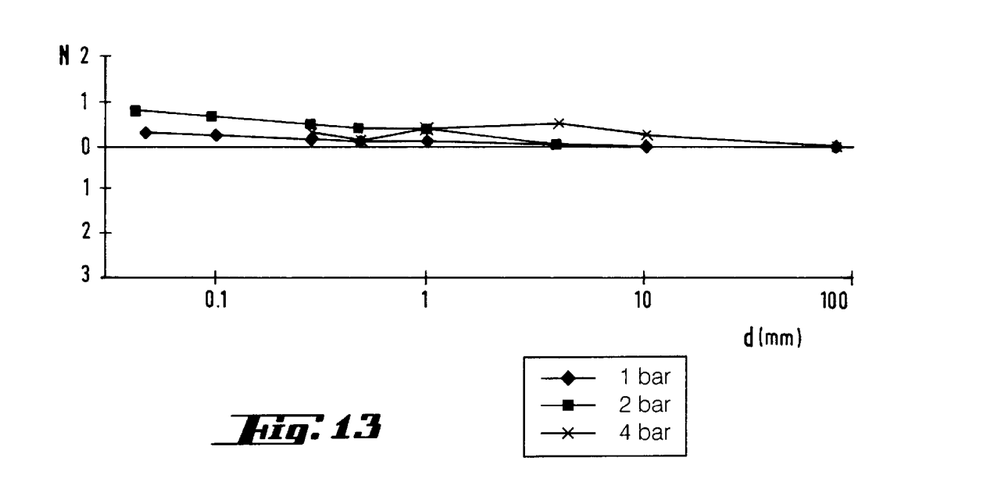

In FIG. 11, the bottle 12 is offset with respect to the orifice but in this configuration the bottle 12 faces the flow of gas leaving the slit which, because of the Coanda effect, runs along the wall 8. It is, however, possible for the bottle 12 to be offset with respect to the orifice in the other direction. Trials were conducted with various gas pressures in this configuration which is not represented in the figures. The results are shown in FIG. 13; the bottle 12 experiences forces of suction which pulls it towards the wall but no pushing force occurs. To avoid contact which could arise, the invention envisages a second slit placed on a wall perpendicular to the wall 8 so as to hold the bottle 12 firmly in the corner formed by the two walls. The bottle 12 is thus brought back into a position similar to the one in FIG. 10 as a result of the suction due to the second slit.

Figure 14:
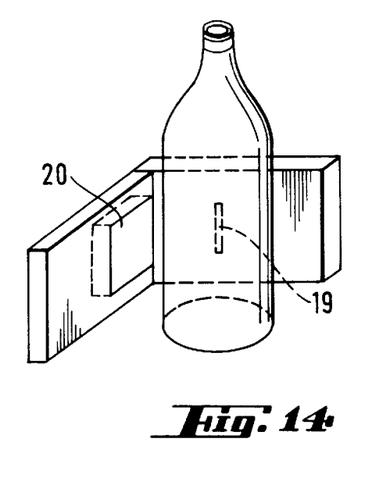

The invention also envisages openings in at least one of the walls of the pusher to allow the flow of gas to discharge and avoid any risk of turbulence. Such an embodiment is illustrated in FIG. 14. Two perpendicular walls forming part of the pusher are represented in this FIG. 14. The slit 19 blows air towards the corner formed by the two walls, the air being discharged through the opening 20 provided on the second wall. When a bottle is present, the latter is sucked into and immobilized in the corner of the pusher. Moreover, as the air is discharged through the opening 20 it does not disturb the positioning of the said bottle. Likewise, when there are two slits placed on two perpendicular walls, these will preferably be positioned at different heights so that they do not interfere with each other.

Figure 15:
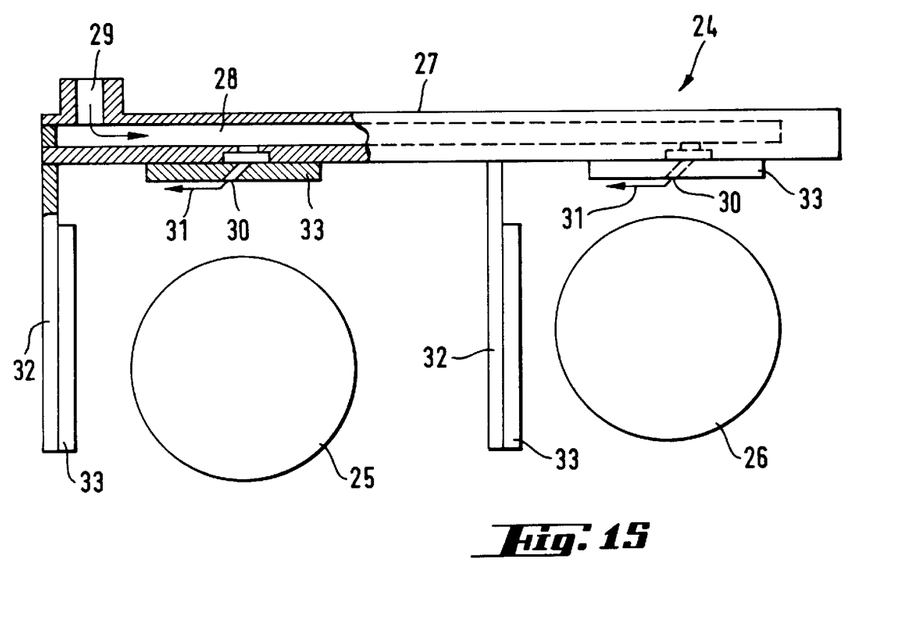

A pusher 24 according to the invention is illustrated in FIG. 15. This pusher 24 has two compartments in which two bottles 25,26 may be housed. Represented diagrammatically in the main wall 27, that is to say the one facing the bottles, is the duct 28 through which compressed air is conveyed from the inlet 29 as far as the slits 30. The Coanda effect symbolized by the arrows 31 occurs at the outlet of these slits. The pushers also have walls or fingers 32 perpendicular to the wall 27 and forming compartments in which the bottles 25,26 are held as the pusher moves along. To avoid any direct contact with the walls, contact materials 33 are provided on each of the walls, and their function is to limit any risk of damaging the glass.

Figure 16:
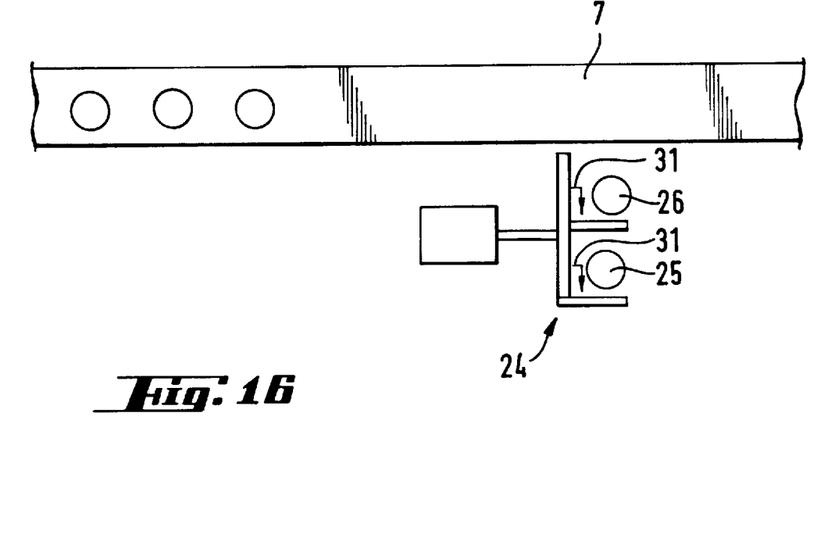
Figure 17:
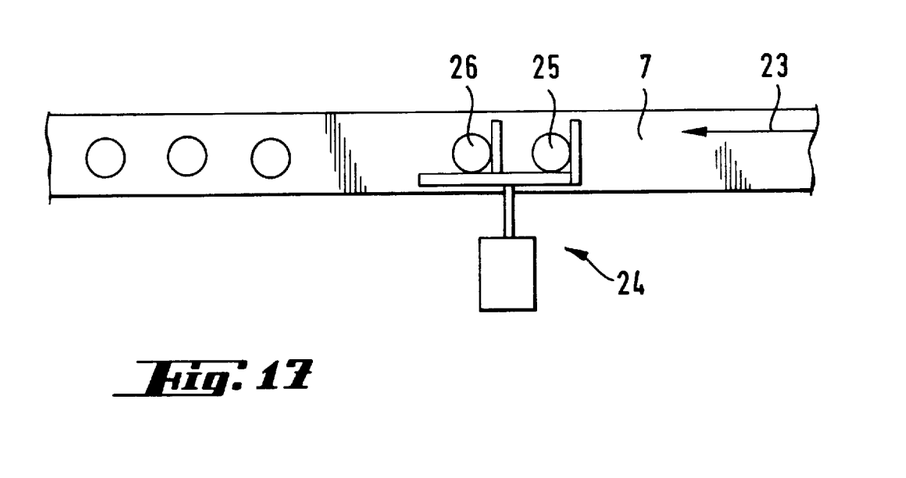

FIGS. 16 and 17 show two extreme positions of the pusher 24 associated with the bottles 25,26. The inventors have been able to demonstrate that while it was necessary to avoid as best possible any contact with the walls of the pusher, it was also very important to guard against centrifugal force due to the movement of the pusher. It is especially to guard against this centrifugal force that the slits are placed on the main wall 27 of the pusher. Although it was seen earlier that it was also possible to provide additional slits on the walls or fingers 32, these additional slits could not be the only ones because the suction would then not be sufficient to combat the centrifugal force because of their positions.

The invention has been described more specifically for an application regarding pushers. However, the results obtained which consist in holding an article firmly, especially using suction forces, while limiting contacts with the wall of the mechanical tool are attractive for other applications such as those mentioned earlier: device for aligning bottles on a conveyor, troughs for conveying gobs. In such cases it is possible to provide different slits acting in succession on the articles travelling past the wall of the tool; for example, bottles can be aligned on a conveyor progressively by the successive intervention of several orifices emitting a jet of gas, while the bottles are conveyed on a rolling belt.

I claim:

1. Method of handling articles in which at least one mechanical tool conveys the article or plays a part in transferring the article, characterized in that at least one jet of gas under pressure is blown through a duct passing through the mechanical tool, and in that the article is held in position on the mechanical tool while limiting contact therewith by an air cushion between said article and said tool, by means of the said jet of gas.

2. Method according to claim 1, characterized in that the articles are made of glass and are at a high temperature while they are being handled.

3. Method according to one of claim 1, characterized in that the blowing of gas starts when the article is a determined distance away from the mechanical tool.

4. Method according to one of claim 1, characterized in that the jet of gas is blown through a duct arranged relative to the wall of the mechanical tool on which it emerges in such a way as to create a Coanda effect on the wall of the mechanical tool.

5. Method according to claim 4, characterized in that the gas flows in a direction similar to the relative path followed by the article with respect to the tool.

6. Method according to claim 1, characterized in that at least two jets of gas are blown, these acting simultaneously or in succession on one and the same article or on different articles.

7. Device for handling articles including a mechanical tool for conveying an article or playing a part in transferring it, characterized in that at least one wall of the tool is pierced with at least one duct connected to a source of gas under pressure to provide an air cushion between said article and said tool, and in that the orifice of the said duct is placed such that the distance separating it from the article decreases during at least a first phase in the handling.

8. Device according to claim 7, characterized in that the direction of the duct forms an angle with the surface of the wall through which it passes in order to form a Coanda effect with the emerging jet of gas.

9. Device according to one of claims 7, characterized in that the orifice of the duct is a slit.

10. Device according to one of claims 7, characterized in that the orifice is composed of a set of holes.

11. Application of the method according to claim 1 for the handling of bottles using a pusher.

12. Application of the method according to claim 11, characterized in that the pusher includes a main wall and perpendicular fingers and in that at least one jet of gas under pressure is blown through a duct passing through the main wall.

13. Application of the method according to claim 1 for the alignment of bottles on a conveyor.

14. Application of the method according to claim 1 for the transportation of gobs.

* * * * *